(12) United States Patent
Matthews

(10) Patent No.: US 7,524,255 B2
(45) Date of Patent: Apr. 28, 2009

(54) TIP-IN BUMP REDUCTION METHODS AND SYSTEMS

(75) Inventor: Gregory P. Matthews, West Bloomfield, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 442 days.

(21) Appl. No.: 11/494,271

(22) Filed: Jul. 27, 2006

(65) Prior Publication Data

US 2008/0026908 A1    Jan. 31, 2008

(51) Int. Cl.
*B60W 10/00* (2006.01)
*B60W 10/06* (2006.01)
(52) U.S. Cl. ........................................ 475/54; 477/169
(58) Field of Classification Search .................. 477/52, 477/53, 54, 58, 61
See application file for complete search history.

(56) References Cited

U.S. PATENT DOCUMENTS

| | | | | |
|---|---|---|---|---|
| 4,957,194 A | * | 9/1990 | Sawa et al. | 477/169 |
| 7,288,046 B2 | * | 10/2007 | Boone et al. | 477/54 |
| 2004/0152559 A1 | * | 8/2004 | Bolander | 477/53 |
| 2005/0137770 A1 | * | 6/2005 | Hosler et al. | 701/51 |

* cited by examiner

*Primary Examiner*—Sherry L Estremsky
*Assistant Examiner*—Edwin A Young

(57) ABSTRACT

A torque converter bump control system is provided. The system includes: a gain module that computes a torque converter gain based on a speed ratio; an increased gain module that computes an increased torque converter gain based on turbine speed; a blended gain module that computes a blended torque converter gain based on the torque converter gain, the increased torque converter gain, and a blend ratio; and a final gain module that selectively sets a final torque converter gain based on the speed ratio and commanded engine torque to at least one of the torque converter gain, the increased torque converter gain, and the blended torque converter gain and wherein engine torque is controlled based on the final torque converter gain.

18 Claims, 5 Drawing Sheets

| Range | C1 | C2 | C3 | C4 | C5 |
|---|---|---|---|---|---|
| 1 | X | | | | X |
| 2 | X | | | X | |
| 3 | X | | X | | |
| 4 | X | X | | | |
| 5 | | X | X | | |
| 6 | | X | | X | |
| R | | | X | | X |
| N | | | | | X |

Clutches Engaged

*Figure 2*

TIP-IN BUMP REDUCTION METHODS AND SYSTEMS

FIELD

The present disclosure relates to methods and system for reducing tip-in bump for powertrains including a torque converter.

BACKGROUND

The statements in this section merely provide background information related to the present disclosure and may not constitute prior art.

Torque-based control can be implemented for internal combustion engines to achieve a desired drive characteristic. Engine torque-based control systems interpret an accelerator pedal position of the vehicle as an engine torque request. The engine is controlled to deliver the requested engine torque to provide the desired drive characteristic.

Axle or wheel torque-based control systems, such as Coordinated Torque Control described in commonly assigned U.S. Pat. No. 7,021,282, can provide improved vehicle response. An axle torque-based control system uses the accelerator pedal position and vehicle speed to determine how much vehicle torque the driver wants in order to achieve the driver's desired acceleration. This vehicle, axle, or wheel torque command is converted to an engine torque command by dividing the axle torque by the overall powertrain transfer ratio. The overall powertrain transfer ratio is the product of the torque ratios of 1) the torque converter, 2) the transmission gearbox, 3) the final drive, and 4) the transfer case (if present).

The final drive ratio is a known fixed ratio. The transfer case (if present) has one of two known ratios (4Hi or 4Low). The gearbox torque ratio is well known when in gear and can be reasonably estimated while shifting. The torque converter torque ratio (or torque converter gain) is usually known to sufficient accuracy, except for the case when the torque converter gain is rapidly increased after returning from an over-run mode (negative slip) to normal converter mode. During this period of rapid rise in converter gain, the torque converter gain estimation can be lagging. This results in a torque bump when the driver tips in after a deceleration maneuver.

SUMMARY

Accordingly, a torque converter bump control system is provided. The system includes: a gain module that computes a torque converter gain based on a speed ratio; an increased gain module that computes an increased torque converter gain based on turbine speed; a blended gain module that computes a blended torque converter gain based on the torque converter gain, the increased torque converter gain, and a blend ratio; and a final gain module that selectively sets a final torque converter gain based on the speed ratio and commanded engine torque to at least one of the torque converter gain, the increased torque converter gain, and the blended torque converter gain and wherein engine torque is controlled based on the final torque converter gain.

In other features, a method of controlling engine torque is provided. The method includes: computing a torque converter gain based on a speed ratio; computing an increased torque converter gain based on turbine speed; computing a blended torque converter gain based on the torque converter gain, the increased torque converter gain, and a blend ratio; and selectively setting a final torque converter gain equal to at least one of the torque converter gain, the increased torque converter gain, and the blended torque converter gain and wherein the selectively setting is based on the speed ratio and commanded engine torque; and controlling engine torque based on the final torque converter gain.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

FIG. 2 is a chart illustrating the required clutches to be engaged in order to achieve a desired gear for a six speed clutch-to-clutch transmission.

DETAILED DESCRIPTION

Figure 1:
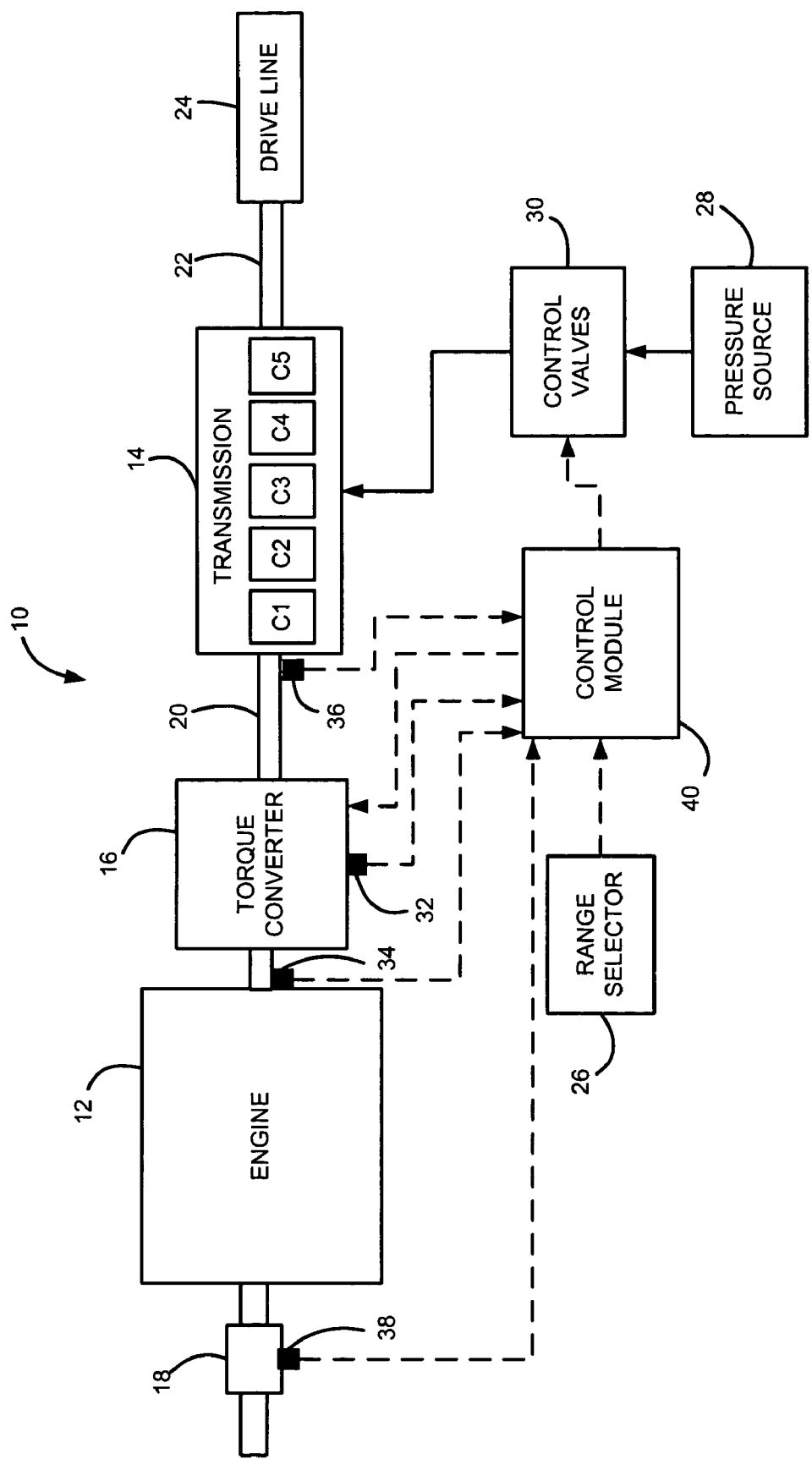
FIG. 1 is a functional block diagram of an exemplary vehicle including a tip-in bump reduction system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Referring now to FIG. 1, a vehicle is shown generally at 10. The vehicle includes an engine 12 that drives a transmission 14 through a torque converter 16. Air is drawn into the engine 12 through a throttle 18. The air is mixed with fuel and combusted within cylinders (not shown) of the engine 12 to produce drive torque. It can be appreciated that the tip-in bump reduction system of the present disclosure can be implemented in engines having a plurality of cylinders including, but not limited to, 2, 3, 4, 5, 6, 8, 10 and 12 cylinders.

The torque converter 16 supplies the engine torque to the transmission via an input shaft 20. The transmission 14 in the exemplary embodiment is a multi-speed, automatic, clutch-to-clutch transmission that drives an output shaft 22 based on engine torque. As can be appreciated, the transmission can be any type of automatic transmission that couples to a torque converter 16. For exemplary purposes, the present invention will be discussed in the context of a six-speed clutch-to-clutch transmission.

The output shaft 22 drives a driveline 24 of the vehicle 10. A range selection device 26 enables an operator to set the transmission 14 at a desired operating range including, but not limited to, park, reverse, neutral, and one or more forward drive positions. The speed and torque relationships between the engine 12 and the driveline 24 are controlled by hydraulically operated clutches C1, C2, C3, C4, and C5 of the transmission 14. Pressurized fluid is provided to the clutches from a regulated hydraulic pressure source 28. The clutches C1, C2, C3, C4, and C5 are coupled to the hydraulic pressure source via control valves 30, which regulate clutch pressure by supplying or discharging fluid to/from the clutches C1, C2, C3, C4, and C5.

Referring now to FIG. 2, in the exemplary transmission, the five clutches C1, C2, C3, C4 and C5 are selectively engaged to provide neutral, six forward drive ratios, and one reverse drive ratio. Although the exemplary automatic transmission 14 includes six forward drive ratios and one reverse drive ratio, it is appreciated that the tip-in bump reduction systems according to the present disclosure can be implemented in automatic transmissions having more or fewer drive ratios.

The table of FIG. 2 illustrates an exemplary combination of engaged clutches to establish the various drive ratios. The first forward drive ratio is established by engaging the first clutch C1 and the fifth clutch C5. The second forward drive ratio is established by disengaging the fifth clutch C5 and substantially simultaneously engaging the fourth clutch C4. To establish the third forward drive ratio, the fourth clutch C4 is disengaged as the third clutch C3 is engaged. The fourth forward drive ratio is established by disengaging the third clutch C3 while engaging the second clutch C2. To establish the fifth forward drive ratio, the first clutch C1 is disengaged as the third clutch C3 is substantially simultaneously engaged. The sixth forward drive ratio is established by disengaging the third clutch C3 and simultaneously engaging the fourth clutch C4. The reverse drive ratio is established by engaging the third clutch C3 and the fifth clutch C5. The transmission 14 is in neutral when only the fifth clutch C5 is engaged.

Referring back to FIG. 1, a first speed sensor 32 senses a rotational speed of the engine and generates an engine speed signal. A second speed sensor 34 senses a rotational speed of a turbine in the torque converter 16 and generates a turbine speed signal. Alternatively, the second speed sensor 36 senses a rotational speed of the input shaft 20 to the transmission 14 and generates an input speed signal. A throttle position sensor 38 senses a position of the throttle 18 and generates a throttle position signal. A control module 40 receives the above mentioned signals and computes a torque converter gain. Based on the torque converter gain, the control module 40 controls engine torque to reduce tip-in bump. The control module 40 controls the operation of at least one of the engine 12, the transmission 14, and the torque converter 16 based on the tip-in bump reduction methods and systems as will be discussed in further detail below.

Figure 3:
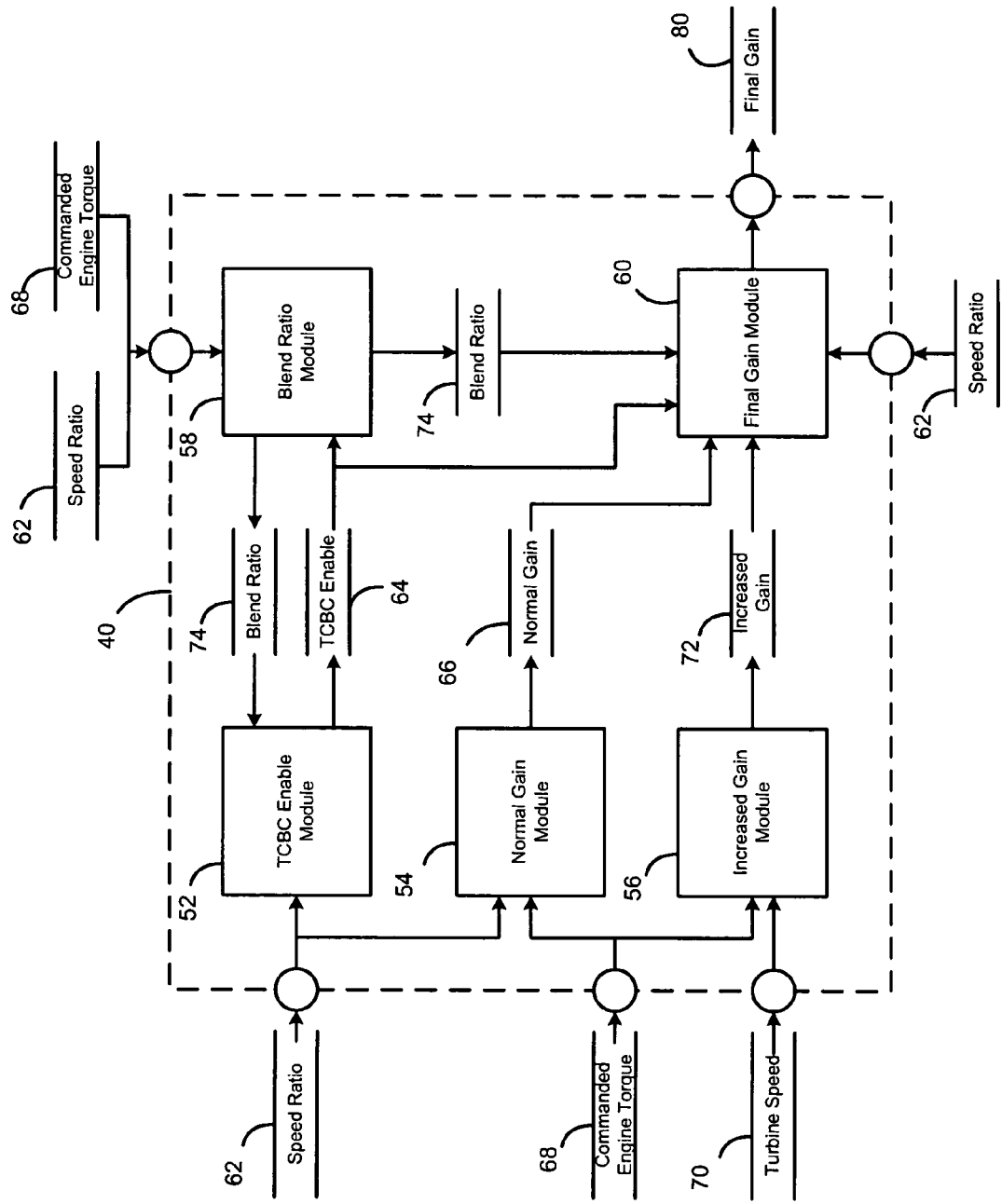
FIG. 3 is a dataflow diagram of a tip-in bump reduction system.

Referring now to FIG. 3, a dataflow diagram illustrates various embodiments of a tip-in bump reduction system that may be embedded within the control module 40. Various embodiments of tip-in bump reduction systems according to the present disclosure may include any number of sub-modules embedded within the control module 40. The sub-modules shown may be combined and/or further partitioned to similarly reduce tip-in bump. Inputs to the system may be sensed from the vehicle 10 (FIG. 1), received from other control modules (not shown) within the vehicle 10 (FIG. 1), and/or determined by other sub-modules (not shown) within the control module 40. In various embodiments, the control module of FIG. 3 includes a torque converter bump control (TCBC) enable module 52, a normal gain module 54, an increased gain module 56, a blend ratio module 58, and a final gain module 60.

The TCBC enable module 52 activates torque converter bump control based on a speed ratio 62. Where speed ratio 62 equals turbine speed divided by engine speed. More specifically, if the speed ratio 62 is less than one, a TCBC enable flag remains FALSE and TCBC is bypassed. Once the speed ratio 62 exceeds one, the TCBC enable flag is set to TRUE and TCBC is enabled. The TCBC enable module 52 disables TCBC based on a current value of the blend ratio as will be discussed further below. The normal gain module 54 computes a normal gain 66 based on the speed ratio 62. The normal gain 66 is computed until the commanded engine torque 68 exceeds a first, smaller threshold. The increased gain module 56 computes an increased gain 72 based on turbine speed 70. The increased gain 72 is computed once the engine torque 68 exceeds the first, smaller threshold, and is used until the speed ratio 62 is below a threshold, then the blend ratio module 58 blends between the normal torque converter gain 54 and the increased gain 56

The blend ratio module 58 computes a blend ratio 74 based on speed ratio 62 and engine torque 68. More specifically, a blend rate is set equal to at least one of a fast rate and a slower rate based on a comparison of engine torque 68 and a second, higher threshold. If the engine torque 68 is greater than the second threshold, the blend rate is set equal to the fast rate. If the engine torque 68 is less than or equal to the threshold, the blend rate is set equal to the slow rate. The blend ratio 74 is initialized to one once TCBC is enabled and held at one until the speed ratio 62 drops below a threshold. Once the speed ratio 62 becomes lower than a threshold the blend ratio 74 is decremented by the blend rate. The blend ratio 74 equals the blend ratio 74 minus the blend rate. This continues until the blend ratio reaches zero and then the blending stops and the TCBC enable flag is reset to FALSE.

The final gain module 60 sets a final gain 80 equal to one of the normal gain 66, the increased gain 72, or a blended gain. The final gain 80 is then made available for use by the control module 40 to control engine torque. The final gain module computes a blended gain by blending between the normal gain 66 and the increased gain 72 based on the blend ratio 74. The final gain module 60 computes the blended gain once the speed ratio 62 drops below a threshold, until the blend rate is reduced to zero, at which time the blending is complete. In various embodiments, the final gain module 60 computes a blended gain (Blended_Gain) based on the increased gain (TC_GainIncd) 72, the normal gain (TC_Gain) 66, the blend ratio (TC_BlendRatio) 74, and the following equation:

Blended_Gain=*TC*_BlendRatio\**TC*_GainIncd+(1−*TC*_BlendRatio)\**TC*_Gain.

Since, for an axle torque-based control system, the commanded engine torque is equal to the commanded axle torque divided by the total powertrain ratio, using the increased torque converter ratio reduces the commanded engine torque until the blended ratio returns to zero. Thus reducing the tip-in bump.

Figure 4:
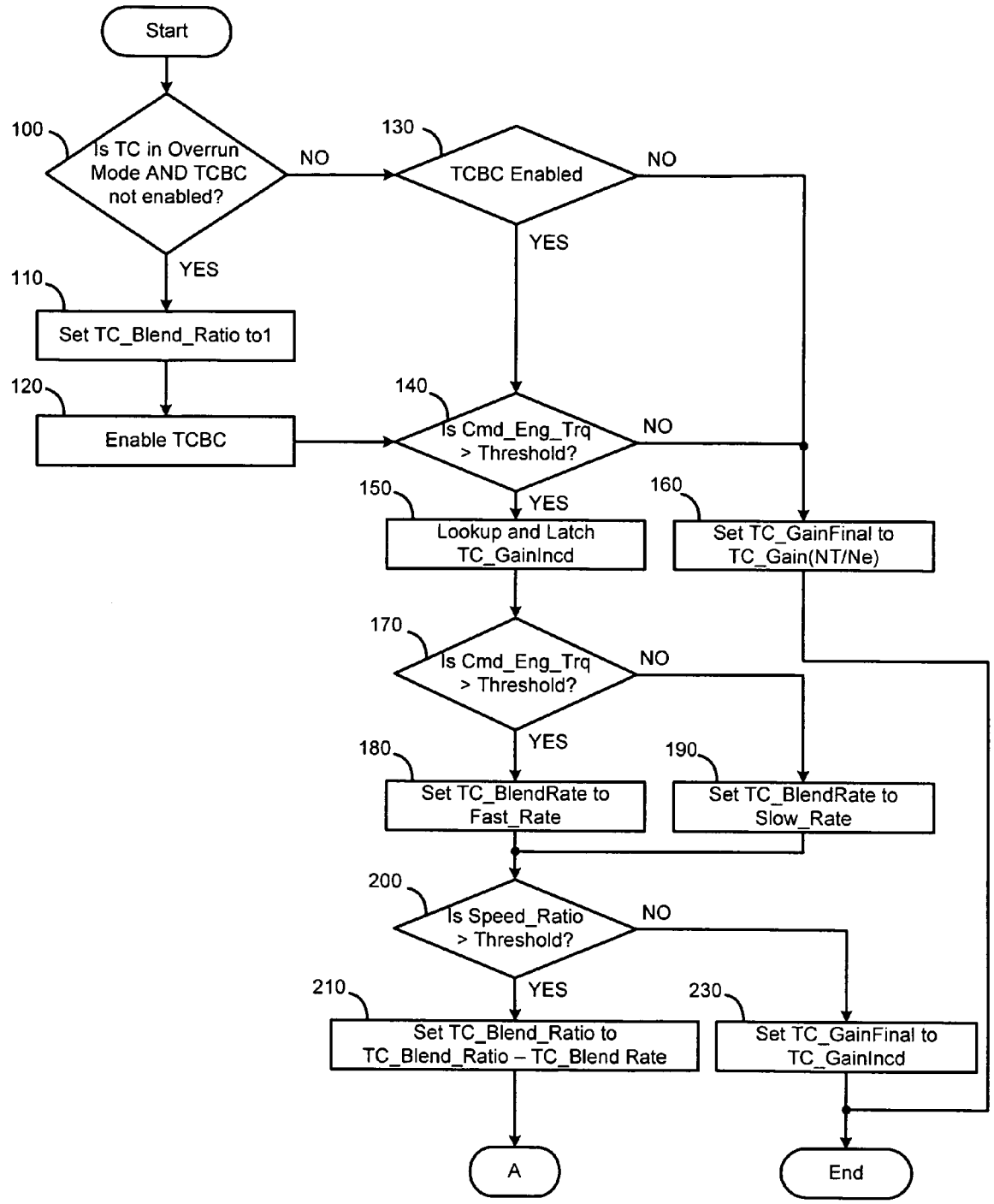
FIGS. 4 and 5 are flowcharts illustrating a tip-in bump reduction method.
Figure 5:
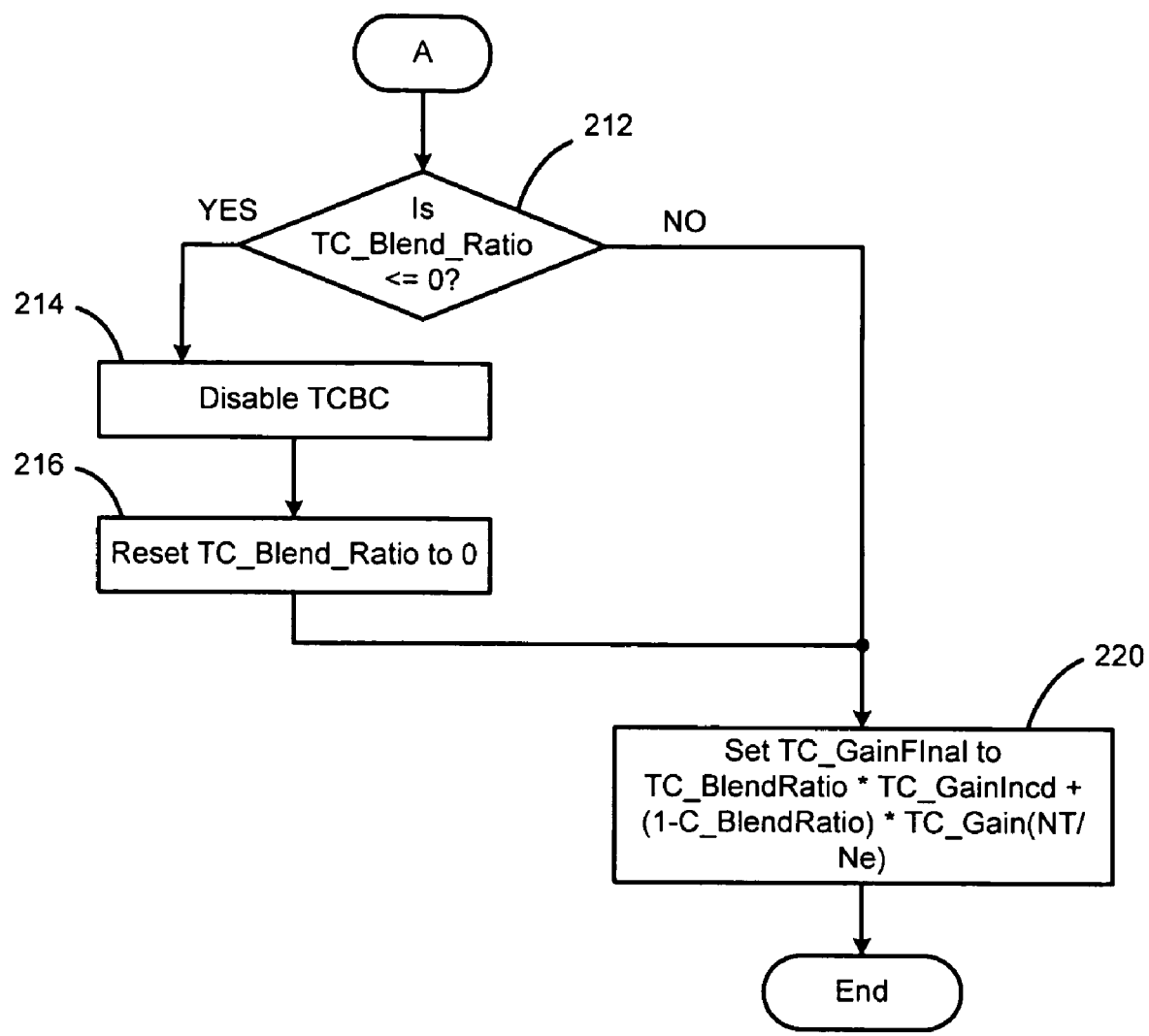

Referring now to FIGS. 4 and 5, a flowchart illustrates a tip-in bump reduction method. The method computes a torque converter final gain value (TC_GainFinal) each time a transmission ratio routine is executed. If the torque converter has entered an overrun mode (i.e., negative slip, where turbine speed is greater than engine speed) and the TCBC enable flag equals FALSE (indicating a first time entering the overrun mode) at 100, then TC_Blend_Ratio is set to one at 110 and the TCBC enable flag is set to TRUE at 120.

Otherwise, if the torque converter is not operating in the overrun mode at 100, then the TCBC enable flag is evaluated at 130. If the TCBC enable flag equals TRUE at 130, then the commanded engine torque is evaluated at 140. If the commanded engine torque is greater than a predetermined threshold at 140, then a TC_GainIncd is computed as a function of turbine speed at 150. Otherwise, if the TCBC enable flag is FALSE at 140, then the system is no longer operating in an overrun mode and the final gain (TC_GainFinal) is set to TC_Gain computed as a function of speed ratio at 160.

If the commanded engine torque is greater than a second larger threshold at 170, then control sets TC_BlendRate to a fast rate at 180. Otherwise, if the commanded engine torque is less than or equal to the larger threshold at 170, control sets TC_BlendRate to a slow rate at 190. If the speed ratio is less than a predetermined value at 200, then control decreases TC_Blend_Ratio by TC_Blend rate at 210. If the TC_Blend_ Ratio is less than or equal to zero at 212 (FIG. 5), then TCBC is disabled at 214 and the TC_Blend_Ratio is reset to zero at 216. If TC_Blend_Ratio is greater than zero at 212, then the final torque converter gain is set equal to a blending of TC_GainIncd and TC_Gain as discussed above at 220. If the speed ratio is greater than or equal to the predetermined value at 200 (FIG. 4), then the TC_GainFinal is set equal to TC_GainIncd, the artificially increased value at 230.

As can be appreciated, all comparisons discussed above can be implemented in various forms depending on the selected values for the comparison. For example, a comparison of "greater than" may be implemented as "greater than or equal to" in various embodiments. Similarly, a comparison of "less than" may be implemented as "less than or equal to" in various embodiments. A comparison of "within a range" may be equivalently implemented as a comparison of "less than or equal to a maximum threshold" and "greater than or equal to a minimum threshold" in various embodiments.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A torque converter bump control system, comprising:
   a gain module that computes a torque converter gain based on a speed ratio;
   an increased gain module that computes an increased torque converter gain based on turbine speed;
   a blended gain module that computes a blended torque converter gain based on the torque converter gain, the increased torque converter gain, and a blend ratio; and
   a final gain module that selectively sets a final torque converter gain based on the speed ratio and commanded engine torque to at least one of the torque converter gain, the increased torque converter gain, and the blended torque converter gain and wherein engine torque is controlled based on the final torque converter gain.

2. The system of claim 1 further comprising an enable module that generates an enable signal based on the speed ratio and wherein the blended gain module performs the computing of the blended torque converter gain based on the enable signal.

3. The system of claim 1 further comprising a blend ratio module that computes the blend ratio based on the speed ratio and the commanded engine torque.

4. The system of claim 3 wherein the blend ratio module selectively determines a blend rate based on commanded engine torque and wherein the blend ratio module computes the blend ratio based on the blend rate.

5. The system of claim 1 wherein the blended gain module computes the blended torque converter gain (Blended_Gain) based on a blend ratio (TC_BlendRatio), the increased torque converter gain (TC_GainIncd), the torque converter gain (TC_Gain) and based on the following equation:

$$Blended\_Gain = TC\_BlendRatio * TC\_GainIncd + (1 - TC\_BlendRatio) * TC\_Gain.$$

6. The system of claim 1 wherein the final gain module sets the final torque converter gain to the increased torque converter gain when the speed ratio is less than a predetermined speed ratio threshold.

7. The system of claim 1 wherein the final gain module sets the final gain to the blended torque converter gain when the speed ratio is greater than a predetermined speed ratio threshold.

8. The system of claim 1 wherein the final gain module sets the final torque converter gain to the torque converter gain when the commanded engine torque is greater than a predetermined torque threshold.

9. The system of claim 1 further comprising an engine torque control module that controls commanded engine torque based on the final torque converter gain.

10. A method of controlling engine torque, comprising:
    computing a torque converter gain based on a speed ratio;
    computing an increased torque converter gain based on turbine speed;
    computing a blended torque converter gain based on the torque converter gain, the increased torque converter gain, and a blend ratio; and
    selectively setting a final torque converter gain equal to at least one of the torque converter gain, the increased torque converter gain, and the blended torque converter gain and wherein the selectively setting is based on the speed ratio and commanded engine torque; and
    controlling engine torque based on the final torque converter gain.

11. The method of claim 10 further comprising enabling the computing of the blended torque converter gain based on the speed ratio.

12. The method of claim 10 further comprising initializing the blend ratio to one after a negative torque converter slip occurs.

13. The method of claim 12 further comprising decrementing the blend ratio by a blend rate when the speed ratio is greater than a speed ratio threshold.

14. The method of claim 13 further comprising selectively determining a blend rate based on commanded engine torque.

15. The method of claim 10 wherein the computing the blended torque converter gain (Blended_Gain) is based on a blend ratio (TC_BlendRatio), the increased torque converter gain (TC_GainIncd), the torque converter gain (TC_Gain) and based on the following equation:

$$Blended\_Gain = TC\_BlendRatio * TC\_GainIncd + (1 - TC\_BlendRatio) * TC\_Gain.$$

16. The method of claim 10 wherein the selectively setting the final torque converter gain comprises setting the final torque converter gain equal to the increased torque converter gain when the speed ratio is less than a predetermined speed ratio threshold.

17. The method of claim 10 wherein the selectively setting the final torque converter gain comprises setting the final torque converter gain equal to the blended torque converter gain when the speed ratio is greater than a predetermined speed ratio threshold.

18. The method of claim 10 wherein the selectively setting the final torque converter gain comprises setting the final torque converter gain equal to the torque converter gain when the commanded engine torque is greater than a predetermined torque threshold.

* * * * *